United States Patent
Camarata et al.

(10) Patent No.: US 12,028,375 B2
(45) Date of Patent: Jul. 2, 2024

(54) DETECTING AND PROTECTING AGAINST EMPLOYEE TARGETED PHISHING ATTACKS

(71) Applicant: Bank of America Corporation, Charlotte, NC (US)

(72) Inventors: Eric Ryan Camarata, Singapore (SG); Harish Tammaji Kulkarni, Singapore (SG)

(73) Assignee: Bank of America Corporation, Charlotte, NC (US)

( * ) Notice: Subject to any disclaimer, the term of this patent is extended or adjusted under 35 U.S.C. 154(b) by 287 days.

(21) Appl. No.: 17/547,741

(22) Filed: Dec. 10, 2021

(65) Prior Publication Data

US 2023/0188564 A1 Jun. 15, 2023

(51) Int. Cl.
| | |
|---|---|
| H04L 9/40 | (2022.01) |
| G06N 20/00 | (2019.01) |
| G10L 15/22 | (2006.01) |
| G10L 15/30 | (2013.01) |

(52) U.S. Cl.
CPC ......... *H04L 63/1483* (2013.01); *G06N 20/00* (2019.01); *G10L 15/22* (2013.01); *G10L 15/30* (2013.01); *H04L 63/1416* (2013.01); *H04L 63/1425* (2013.01); *H04L 63/20* (2013.01)

(58) Field of Classification Search
CPC ............. H04L 63/1483; H04L 63/1416; H04L 63/1425; H04L 63/20; G06N 20/00; G10L 15/22; G10L 15/30
See application file for complete search history.

(56) References Cited

U.S. PATENT DOCUMENTS

| | | |
|---|---|---|
| 2009/0106318 A1 | 4/2009 | Mantripragada et al. |
| 2009/0217039 A1 | 8/2009 | Kurapati et al. |
| 2011/0211682 A1 | 9/2011 | Singh et al. |
| 2015/0046162 A1 | 2/2015 | Aley-Raz et al. |
| 2015/0124945 A1 | 5/2015 | Kurapati et al. |
| 2015/0264084 A1 | 9/2015 | Kashyap et al. |
| 2018/0097838 A1 | 4/2018 | Stolarz et al. |
| 2018/0151181 A1* | 5/2018 | Allen .................... H04L 51/212 |
| 2018/0240028 A1 | 8/2018 | Baracaldo Angel et al. |
| 2018/0241647 A1 | 8/2018 | Baracaldo Angel et al. |
| 2019/0005428 A1 | 1/2019 | Kras et al. |
| 2019/0020682 A1 | 1/2019 | Edwards et al. |
| 2019/0156034 A1 | 5/2019 | Kedem et al. |
| 2019/0158530 A1 | 5/2019 | Emigh et al. |

(Continued)

*Primary Examiner* — Normin Abedin
(74) *Attorney, Agent, or Firm* — Banner & Witcoff, Ltd.

(57) ABSTRACT

Methods, systems, computer-readable media, and apparatuses for detecting and protecting against employee targeted phishing attacks. In some embodiments, a computing platform may monitor an endpoint device. The computing platform may receive a notification that a call has started on the endpoint device. The computing platform may receive data associated with the call. The computing platform may apply voice-to-text analysis of the received data. The computing platform may perform initial validations of the received data converted to text. The computing platform may match the text against threat actor scripts. The computing platform may update an information security threat score. The computing platform may send a message to the endpoint device indicating that a potential information security threat has been detected.

19 Claims, 8 Drawing Sheets

(56) References Cited

U.S. PATENT DOCUMENTS

| | | |
|---|---|---|
| 2019/0158535 A1 | 5/2019 | Kedem et al. |
| 2020/0067861 A1 | 2/2020 | Leddy et al. |
| 2020/0067976 A1 | 2/2020 | Jakobsson |
| 2020/0067978 A1 | 2/2020 | Jakobsson |
| 2020/0082310 A1 | 3/2020 | Chapman |
| 2020/0296133 A1* | 9/2020 | Kras .................. H04L 63/1433 |
| 2021/0029164 A1 | 1/2021 | Albero et al. |
| 2021/0058395 A1 | 2/2021 | Jakobsson |
| 2021/0084147 A1 | 3/2021 | Kent et al. |
| 2021/0193174 A1* | 6/2021 | Enzinger ................. G10L 17/00 |
| 2021/0195022 A1 | 6/2021 | Sarwar et al. |
| 2021/0329030 A1 | 10/2021 | Kedem et al. |
| 2021/0365866 A1 | 11/2021 | Kras et al. |
| 2022/0377171 A1* | 11/2022 | Joshi ...................... G06N 20/00 |

* cited by examiner

DETECTING AND PROTECTING AGAINST EMPLOYEE TARGETED PHISHING ATTACKS

BACKGROUND

Aspects of the disclosure generally relate to one or more computer systems, servers, and/or other devices including computer hardware and/or software. In particular, one or more aspects of the disclosure generally relate to computer hardware and/or software for detecting and protecting against employee targeted phishing attacks.

Large organizations, such as financial institutions, may be subject to, and accordingly may need to handle and/or resolve, many different kinds of threats, including information security threats against their employees. Some examples of the types of information security threats that employees of an organization may face include phishing schemes, and the like. In using conventional systems and techniques to identify, manage, mitigate, resolve, and/or otherwise handle various kinds of information security threats, an organization, such as a financial institution, may expend a great deal of resources, such as in training employees on how to identify and report phishing attacks. But these conventional systems and techniques might not be able to appropriately address all of the information security threats that the organization and its employees may face.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with detecting and protecting against employee targeted phishing attacks, such as phishing calls (e.g., also known as vishing or voice phishing) from threat actors impersonating legitimate user identities. In accordance with one or more embodiments, a computing platform having at least one processor, a communication interface, and memory may monitor an endpoint device. The computing platform may receive a notification that a call has started on the endpoint device. The computing platform may receive data associated with the call. The computing platform may apply voice-to-text analysis of the received data. The computing platform may perform initial validations of the received data converted to text. The computing platform may match the text against threat actor scripts. The computing platform may update an information security threat score. The computing platform may send a message to the endpoint device indicating that a potential information security threat has been detected.

In some embodiments, performing the initial validations may include validating a name of a caller associated with the call or a phone number associated with the call.

In some embodiments, the computing platform may record the data associated with the call.

In some embodiments, the computing platform may detect an information security policy break, and cause the call on the endpoint device to be terminated in response to detecting the policy break.

In some embodiments, the computing platform may send a message to the endpoint device indicating that the call has been terminated.

In some embodiments, monitoring the endpoint device may include monitoring activity associated with a call on a mobile phone.

In some embodiments, monitoring the endpoint device may include monitoring activity associated with a call on a desk phone.

In some embodiments, detecting an information security policy break may include detecting that a receiver of the call has supplied sensitive information.

In some embodiments, a receiver of the call is an employee operating the endpoint device.

In some embodiments, the computing platform may, based on the received data associated with the call, update a machine learning model used to identify the potential information security threat.

By leveraging various aspects of these techniques and/or the other features and functionalities discussed in greater detail below, information security incidents and/or information security threats against employees can be handled in more effective, efficient, scalable, and convenient ways, as various embodiments discussed in greater detail below can reduce the amount of computing and/or network resources that are consumed, as well as the amount of oversight that might otherwise be required, in carrying out and/or facilitating various information security functions and/or processes. Additionally, this can be achieved while providing improved recognition and/or handling of such information security incidents and threats.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
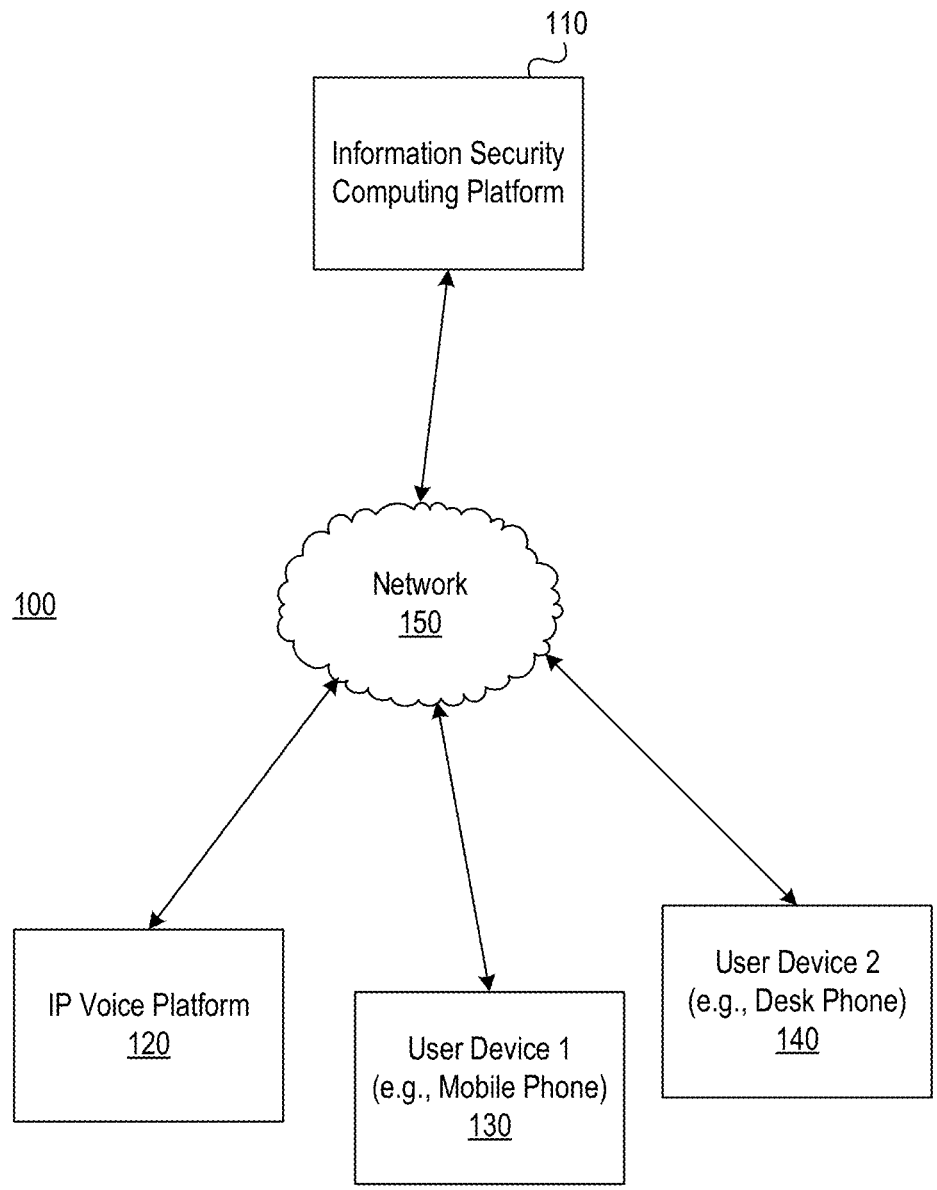
FIGS. 1A and 1B depict an illustrative computing environment for detecting and protecting against employee targeted phishing attacks in accordance with one or more example embodiments.
Figure 1B:
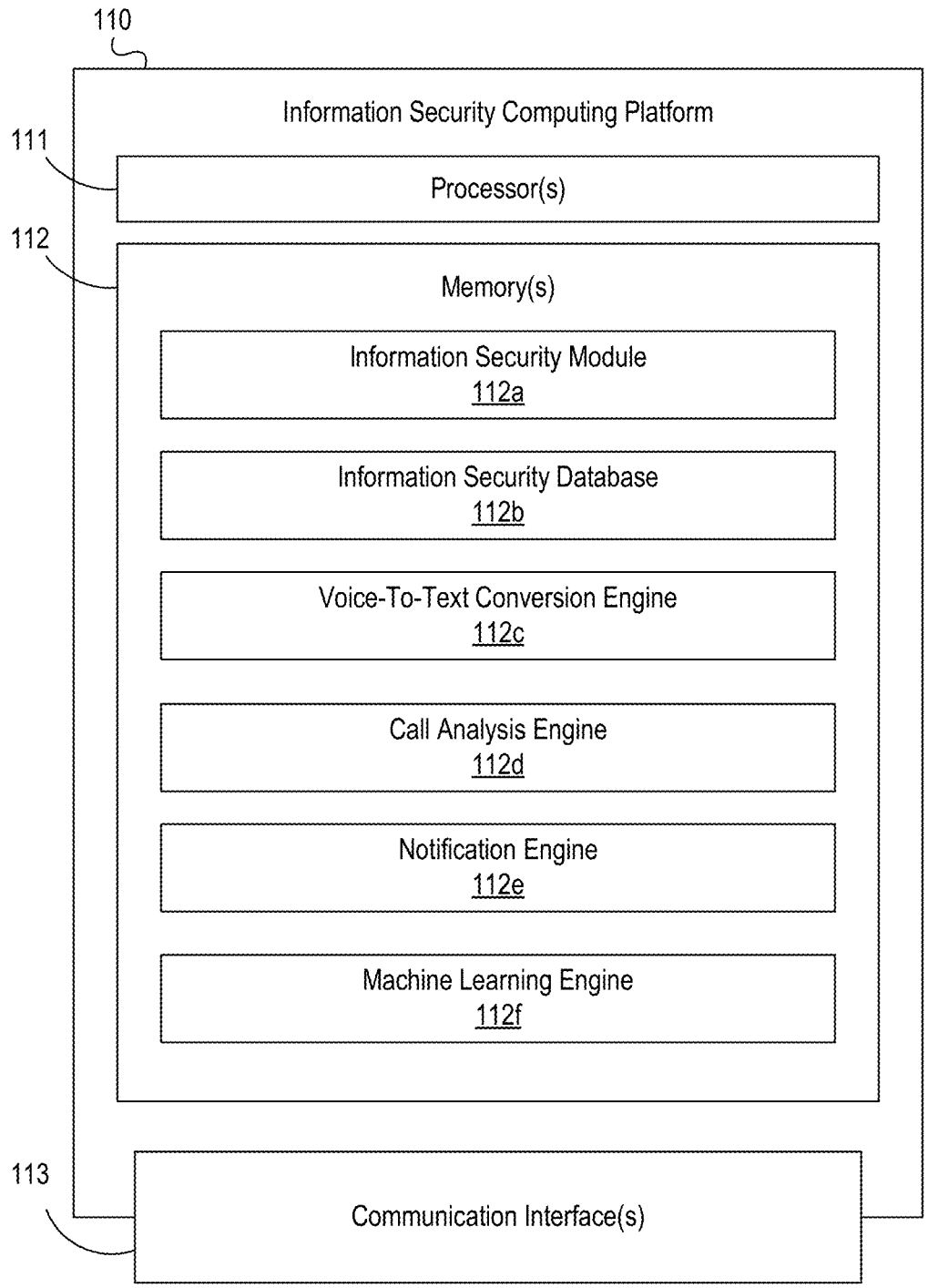

FIGS. 1A and 1B depict an illustrative computing environment for detecting and protecting against employee targeted phishing attacks in accordance with one or more example arrangements. Referring to FIG. 1A, computing environment 100 may include one or more devices (e.g., computer systems, communication devices, servers). For example, computing environment 100 may include an information security computing platform 110, an internet protocol (IP) voice platform 120, a first user device 130, and a second user device 140. Although two user devices 130, 140 are shown for illustrative purposes, any number of user devices may be used without departing from the disclosure.

As illustrated in greater detail below, information security computing platform 110 may include one or more computing devices configured to perform one or more of the functions described herein. For example, information security computing platform 110 may include one or more computers (e.g., laptop computers, desktop computers, servers, server blades, or the like).

IP voice platform 120 may include one or more computing devices and/or other computer components (e.g., processors, memories, communication interfaces). In addition, IP voice platform 120 may be configured to provide transmission of voice content over an Internet connection (using a Voice over Internet Protocol (VoIP)). IP voice platform 120 also may be configured to provide call recording features and caller ID features.

User device 130 may be a mobile computing device (e.g., smartphone, tablet, smart watch, laptop computer, or the like) and/or may include a smart speaker or other related devices. In addition, user device 130 may be linked to and/or used by a first user (who may, e.g., be an employee of an enterprise organization). User device 140 may be a desktop computing device (e.g., desktop computer, terminal, or the like) and/or may include a smart speaker or other related devices. In addition, user device 140 may be linked to and/or used by a second user (who may, e.g., be an employee of an enterprise organization (e.g., a financial institution).

Computing environment 100 also may include one or more networks, which may interconnect one or more of information security computing platform 110, IP voice platform 120, user device 130, and user device 140. For example, computing environment 100 may include network 150. Network 150 may include one or more sub-networks (e.g., local area networks (LANs), wide area networks (WANs), or the like). For example, network 150 may include a private sub-network that may be associated with a particular organization (e.g., a corporation, financial institution, educational institution, governmental institution, or the like) and that may interconnect one or more computing devices associated with the organization. For example, information security computing platform 110, user device 130, and user device 140 may be associated with an organization (e.g., a financial institution), and network 150 may be associated with and/or operated by the organization, and may include one or more networks (e.g., LANs, WANs, virtual private networks (VPNs), or the like) that interconnect information security computing platform 110, user device 130, and user device 140. Network 150 also may include a public sub-network that may connect the private sub-network and/or one or more computing devices connected thereto (e.g., information security computing platform 110, user device 130, and user device 140) with one or more networks and/or computing devices that are not associated with the organization (e.g., IP voice platform 120).

In one or more arrangements, information security computing platform 110, IP voice platform 120, user device 130, and user device 140 may be any type of computing device capable of receiving a user interface, receiving input via the user interface, and communicating the received input to one or more other computing devices. For example, information security computing platform 110, IP voice platform 120, user device 130, user device 140, and/or the other systems included in computing environment 100 may, in some instances, include one or more processors, memories, communication interfaces, storage devices, and/or other components. As noted above, and as illustrated in greater detail below, any and/or all of the computing devices included in computing environment 100 may, in some instances, be special-purpose computing devices configured to perform specific functions.

Referring to FIG. 1B, information security computing platform 110 may include one or more processors 111, memory 112, and communication interface 113. A data bus may interconnect processor 111, memory 112, and communication interface 113. Communication interface 113 may be a network interface configured to support communication between information security computing platform 110 and one or more networks (e.g., network 150, or the like). Memory 112 may include one or more program modules having instructions that when executed by processor 111 cause information security computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of information security computing platform 110 and/or by different computing devices that may form and/or otherwise make up information security computing platform 110. For example, memory 112 may have, host, store, and/or include information security module 112a, information security database 112b, voice-to-text conversion engine 112c, call analysis engine 112d, notification engine 112e, and machine learning engine 112f.

Information security module 112a may have instructions that direct and/or cause information security module 112a to identify information security threats targeted at employees and generate alerts/notifications and/or perform other functions, as discussed in greater detail below. Information security database 112b may store information used by information security module 112a and/or information security computing platform 110 in identifying information security threats targeted at employees and generating alerts/notifications and/or in performing other functions. Voice-to-text conversion engine 112c may have instructions that direct and/or cause information security computing platform 110 to receive data (e.g., voice or audio data) from a monitoring application (e.g., deployed on an end user device) and convert the voice/audio data into text data and/or perform other functions. Call analysis engine 112d may have instructions that direct and/or cause information security computing platform 110 to analyze the call and perform various checks, such as immediate name validation (e.g., comparing the caller's name against a corporate directory or other database), matching the call data against threat actor scripts (e.g., comparing audio/call data against known malicious audio/call details) and/or perform other functions, as discussed in greater detail below. Notification engine 112e may have instructions that direct and/or cause information security computing platform 110 to push notifications back to an end user device, alert users that a call is potentially malicious or fraudulent, alert users that a call is being terminated or blocked, and/or perform other functions, as discussed in greater detail below. For example, notifications may include reminders not to disclose multi-factor authentication codes, passwords, and/or other sensitive information. Machine learning engine 112f may have instructions that direct and/or cause information security computing platform 110 to set, define, and/or iteratively redefine rules, techniques and/or other parameters used by information security computing platform 110 and/or other systems in computing environment 100 in detecting and protecting against employee targeted phishing attacks.

Figure 2A:
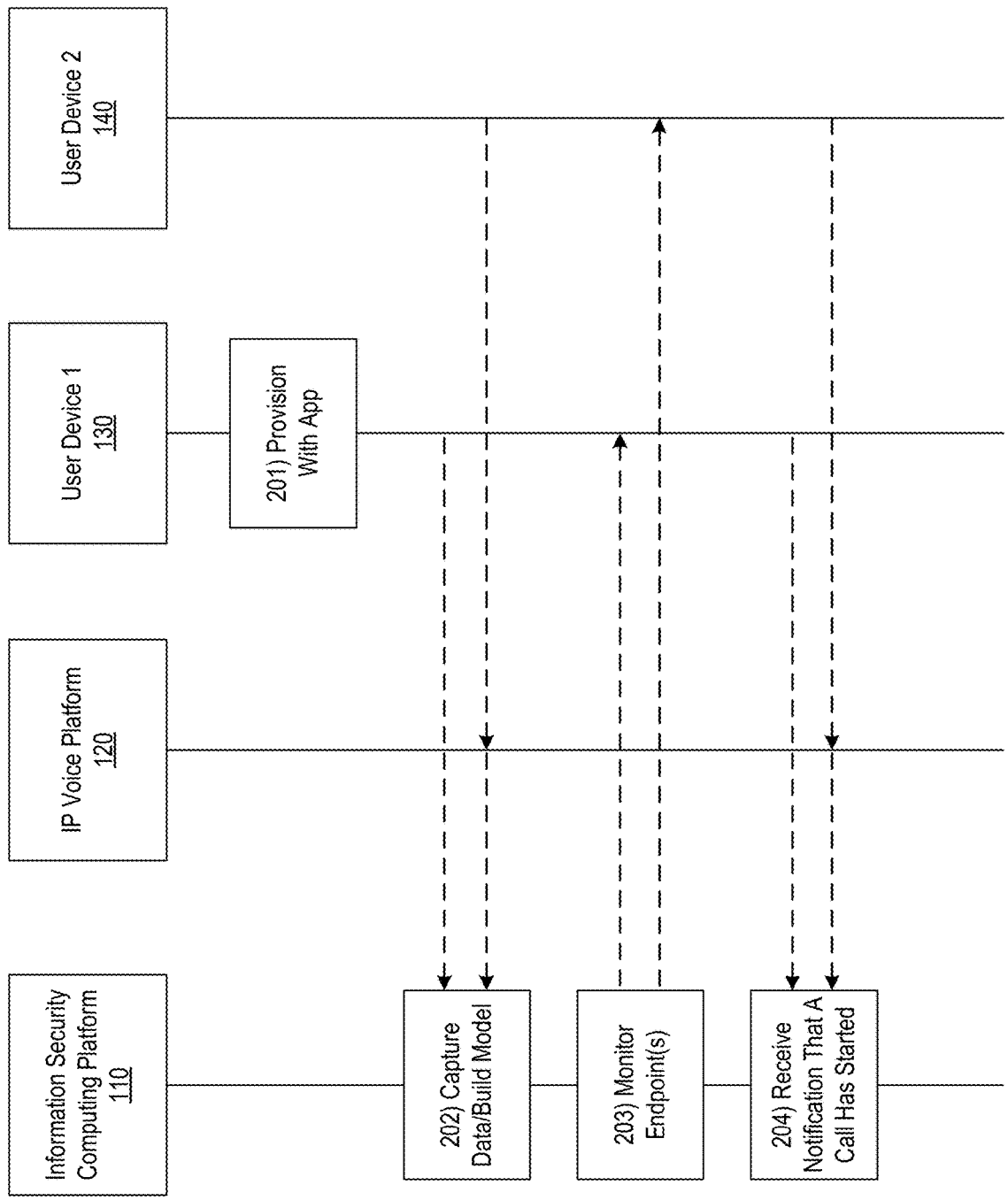
FIGS. 2A-2D depict an illustrative event sequence for detecting and protecting against employee targeted phishing attacks in accordance with one or more example embodiments.

FIGS. 2A-2D depict an illustrative event sequence for detecting and protecting against employee targeted phishing attacks in accordance with one or more example embodiments. Particular attention is made to phishing attacks targeted at employees of an organization, with the aim of protecting the security of customer information. Referring to FIG. 2A, at step 201, user device 130 (e.g., a corporate mobile phone) may be provisioned with an application (e.g., a monitoring application). User device 140 (e.g., a corporate desk phone) may be connected to and supported by backend IP voice platform 120. In some embodiments, at step 202, during an initial training or configuration phase, for example, information security computing platform 110 may collect data, build data sets, train models, and/or the like.

At step 203, information security computing platform 110 may monitor an endpoint device (e.g., user device 130, user device 140) operated by a current employee. At step 204, information security computing platform 110 may receive, via the communication interface (e.g., communication interface 113), a notification or data indicating that a call has started on the endpoint device (e.g., user device 130, user device 140). In some examples, the call may be with a live agent (e.g., a person). Alternatively, the call may be an automated call (e.g., with a software-based tool).

Figure 2B:
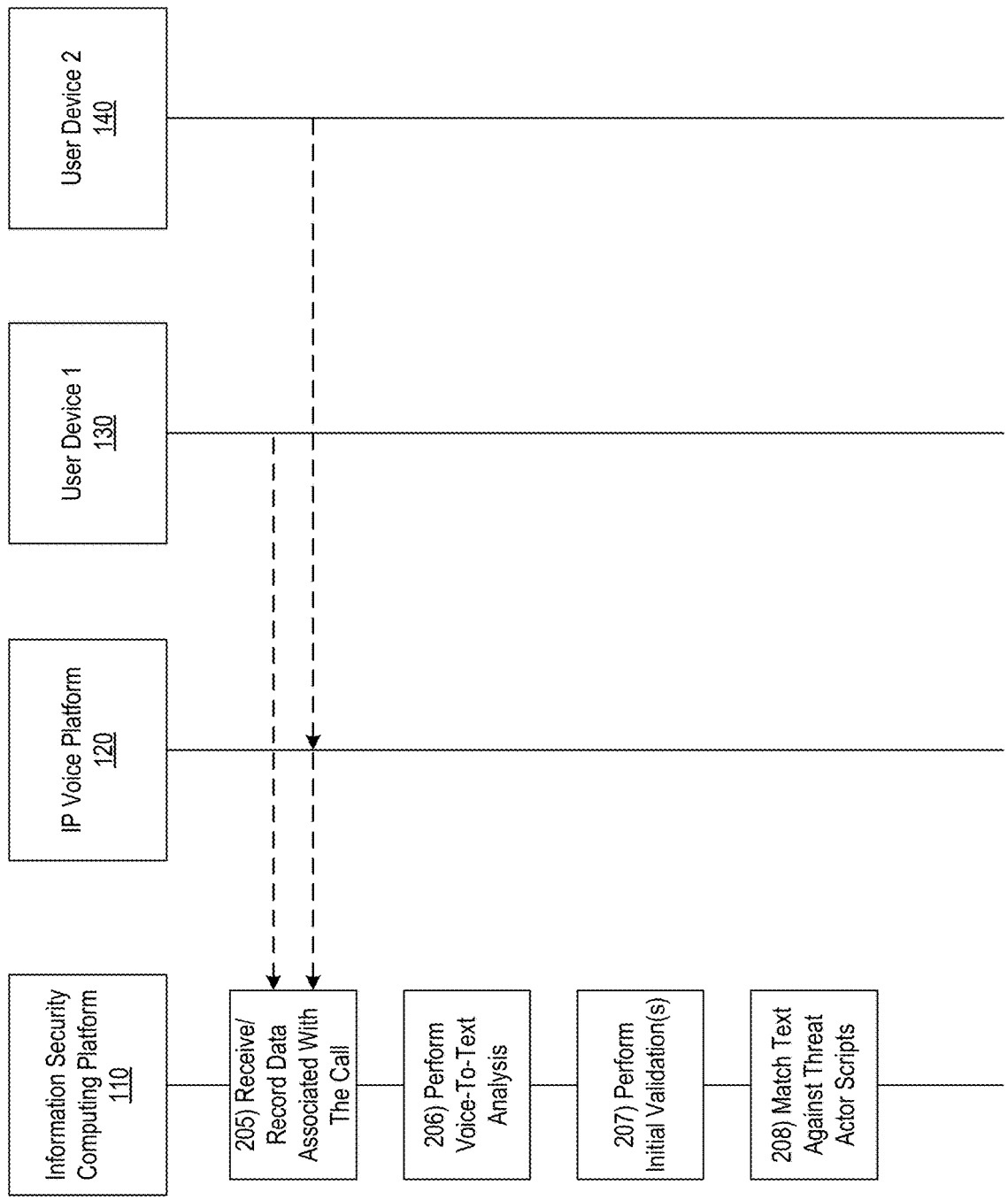

Referring to FIG. 2B, at step 205, information security computing platform 110 may receive, via the communication interface (e.g., communication interface 113), data (e.g., voice or audio data) associated with the call. In some examples, information security computing platform 110 may record the voice or audio data (e.g., employee phone calls) from the endpoint device (e.g., user device 130, user device 140), to a database (e.g., information security database 112b), for analysis.

At step 206, information security computing platform 110 may (e.g., via voice-to-text conversion engine 112c) apply voice-to-text analysis of the received data. For example, the voice or audio data may be transferred to text format and analyzed (e.g., via call analysis engine 112d) in real-time. For example, in conducting the call analysis, information security computing platform 110 may, at step 207, perform initial validations of the received data converted to text format. For instance, information security computing platform 110 may validate various information associated with the call, such as a name of the caller, a phone number associated with the call, a department name mentioned during the call, an email address of the caller, a country where the call is originating from, and/or the like. In one example, in comparing the caller's name or phone number against a corporate directory or other database, it may be determined that the caller is not a legitimate caller (e.g., is not Help Desk employee, or is not an employee's manager) and/or may be an imposter (e.g., a scammer posing as a Help Desk employee, or a scammer posing as a higher level person within an organization). Additionally or alternatively, in performing voice-to-text analysis of the received data, information security computing platform 110 may detect a modulated voice pitch (e.g., using a voice detection algorithm). In addition, presence of a modulated voice may an indicator for risk assessment. In some embodiments, at step 208, information security computing platform 110 may match the text information against threat actor scripts (e.g., that may be or are known to have been used by threat actors). In addition, one or more pattern matching algorithms may be used.

Figure 2C:
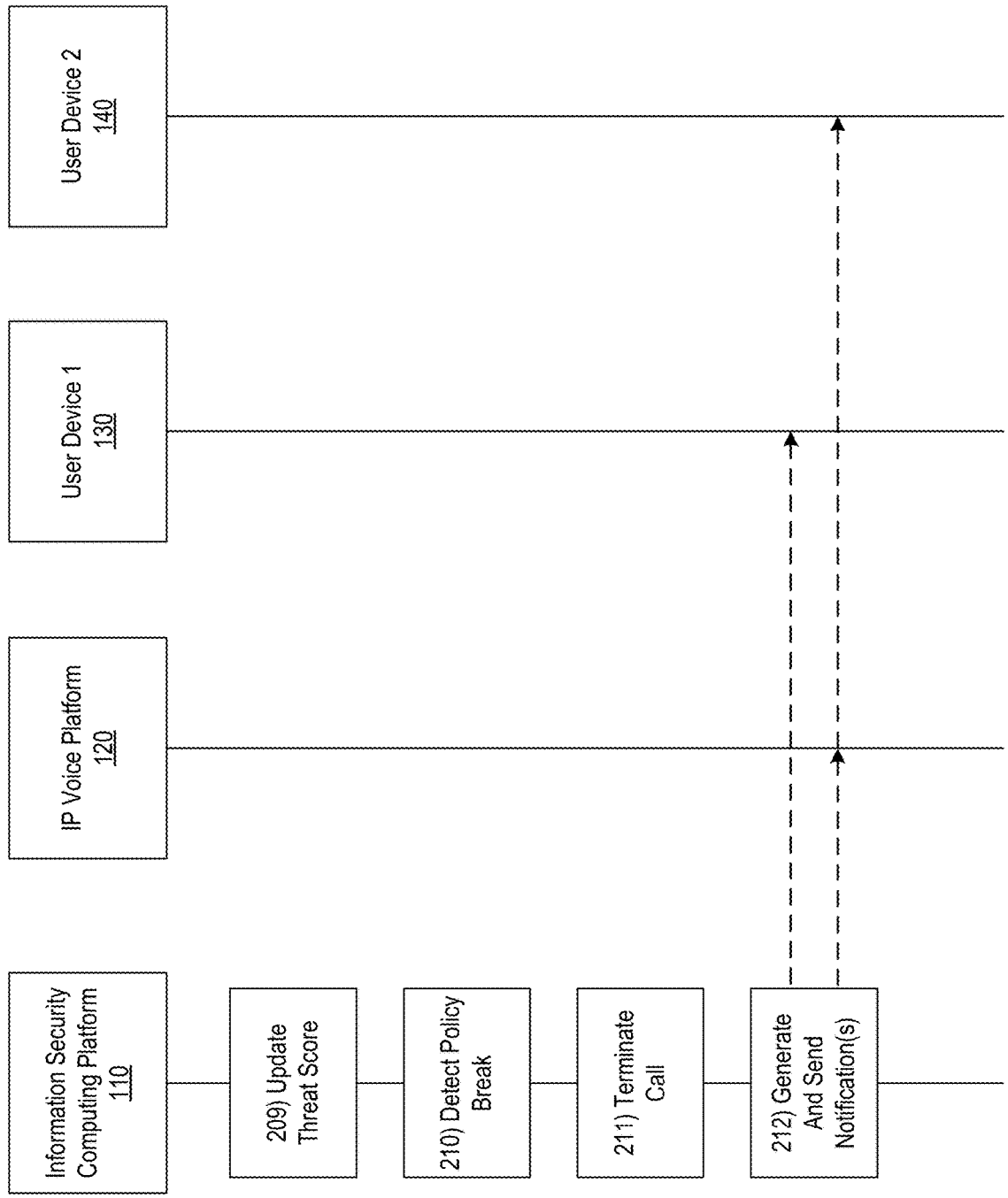
Figure 2D:
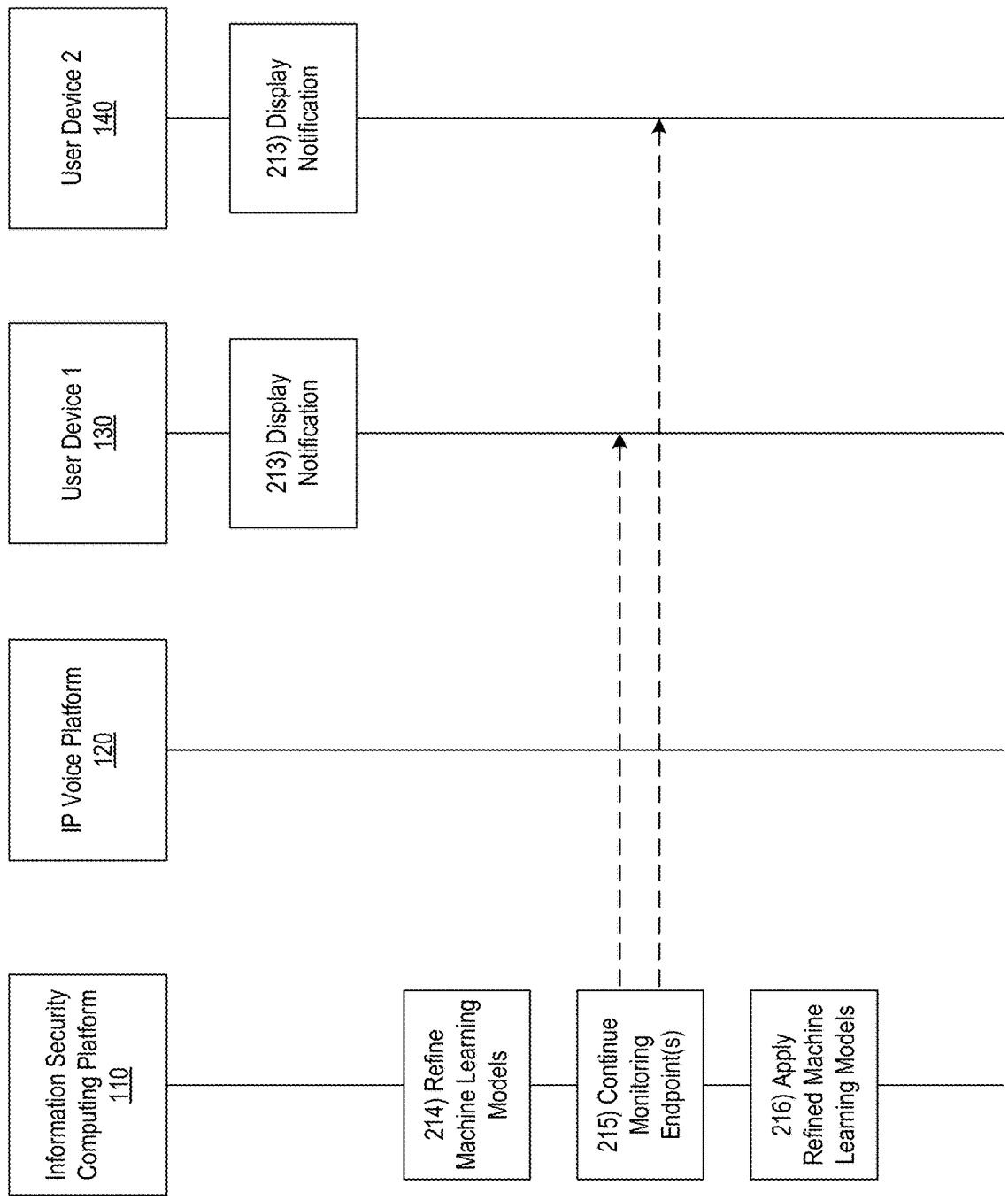

Referring to FIG. 2C, at step 209, information security computing platform 110 may update a threat score (e.g., information security threat score). The threat score may correspond to a measure of a potential for harm resulting from fraudulent activity (e.g., a phishing scam). In some examples, the threat score may be updated in real-time. For example, the threat score might go up or down in real-time with respect to the call and the information being captured from the call. For instance, if the text information associated with the call matches a known threat actor script, the threat score may go high, and if the threat score exceeds a predetermined threshold, an alert may be generated and sent to the endpoint device. Additionally, the alert may be varied based on whether the endpoint device is a mobile phone or a desk phone.

In some embodiments, at step 210, information security computing platform 110 may, detect an information security policy break (e.g., security violation). For example, information security computing platform 110 may detect that a receiver of the call (e.g., the current employee) has supplied the caller (e.g., a scammer) with sensitive information (e.g., an employee discloses a password or multi-factor authentication code over the phone). At step 211, in response to detecting the policy break, information security computing platform 110 may cause the call on the endpoint device (e.g., user device 130, user device 140) to be terminated.

At step 212, information security computing platform 110 may send, via the communication interface (e.g., communication interface 113), one or more notifications or alerts (e.g., via notification engine 112e) to the endpoint device (e.g., user device 130, user device 140). In turn, referring to FIG. 2D, at step 213, the endpoint device (e.g., user device 130, user device 140) may display the one or more notifications.

Figure 3:
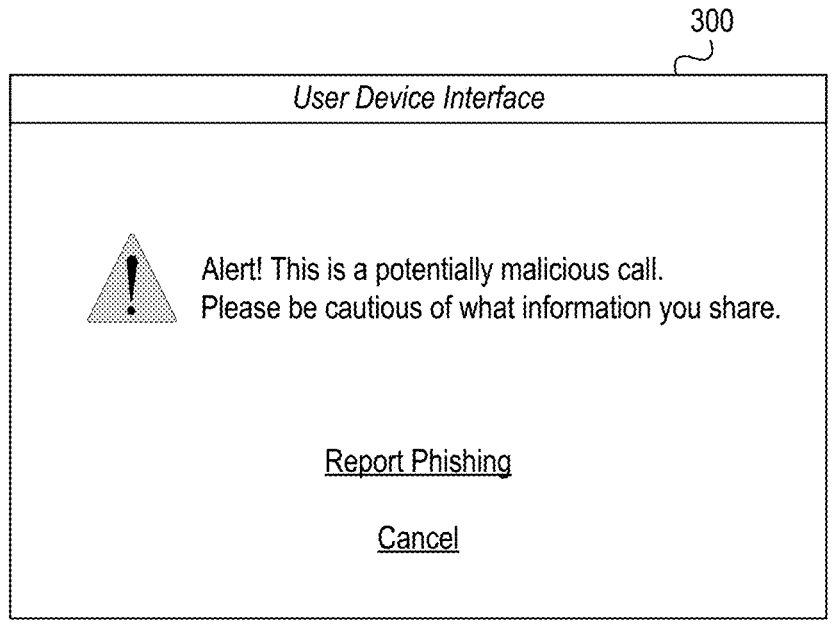
FIGS. 3 and 4 depict example graphical user interfaces for detecting and protecting against employee targeted phishing attacks in accordance with one or more example embodiments.

In one example, following call analysis at steps 206-208, for example, information security computing platform 110 may send a message indicating that a potential information security threat has been detected. For instance, information security computing platform 110 may cause a computing device (e.g., user device 130, user device 140) to display and/or otherwise present a graphical user interface similar to graphical user interface 300, which is illustrated in FIG. 3. As seen in FIG. 3, graphical user interface 300 may include text and/or other information alerting the user of a potentially malicious call and/or reporting options (e.g., "Alert! This is a potentially malicious call. Please be cautious of what information you share. Report Phishing|Cancel . . . "). In this way, employees may be alerted before they might fall victim to a phishing attack.

Figure 4:
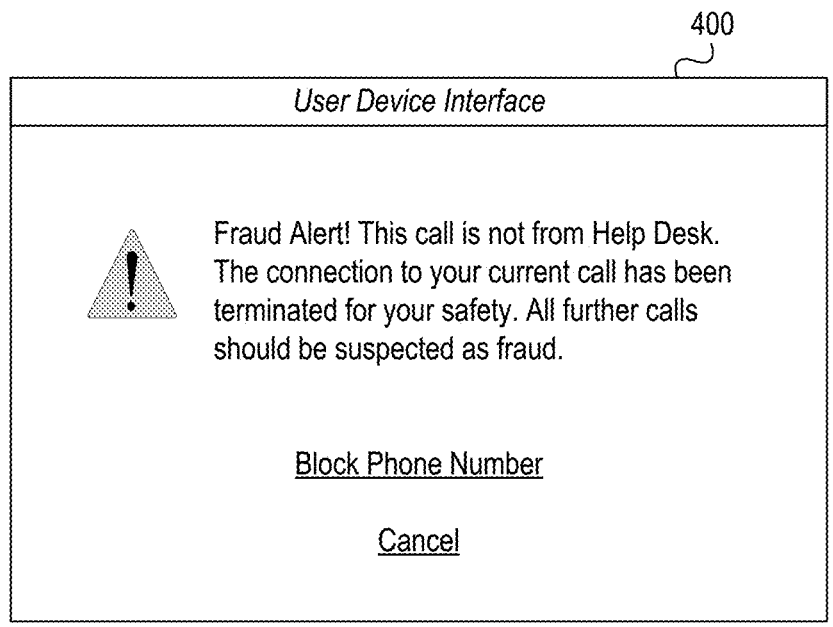

In another example, following termination of the call on the endpoint device at step 211, information security computing platform 110 may send a message indicating that the call has been terminated. For instance, information security computing platform 110 may cause a computing device (e.g., user device 130, user device 140) to display and/or otherwise present a graphical user interface similar to graphical user interface 400, which is illustrated in FIG. 4. As seen in FIG. 4, graphical user interface 400 may include text and/or other information alerting the user of that the call is being terminated and/or other warning notifications (e.g., "Fraud Alert! This call is not from Help Desk. The connection to your current call has been terminated for your safety. All further calls should be suspected as fraud. Block Phone Number|Cancel . . . "). In this way, the call may be terminated and/or blocked before the seriousness of the situation might be further compounded.

Returning to FIG. 2D, at step 214, based on the received data associated with the call, information security computing platform 110 may update or refine a machine learning model used to identify the potential information security threat. At step, 215, information security computing platform 110 may continue monitoring endpoint devices (e.g., user device 130, user device 140) and, at step 216, apply the refined machine learning models in detecting and protecting against employee targeted phishing attacks.

Figure 5:
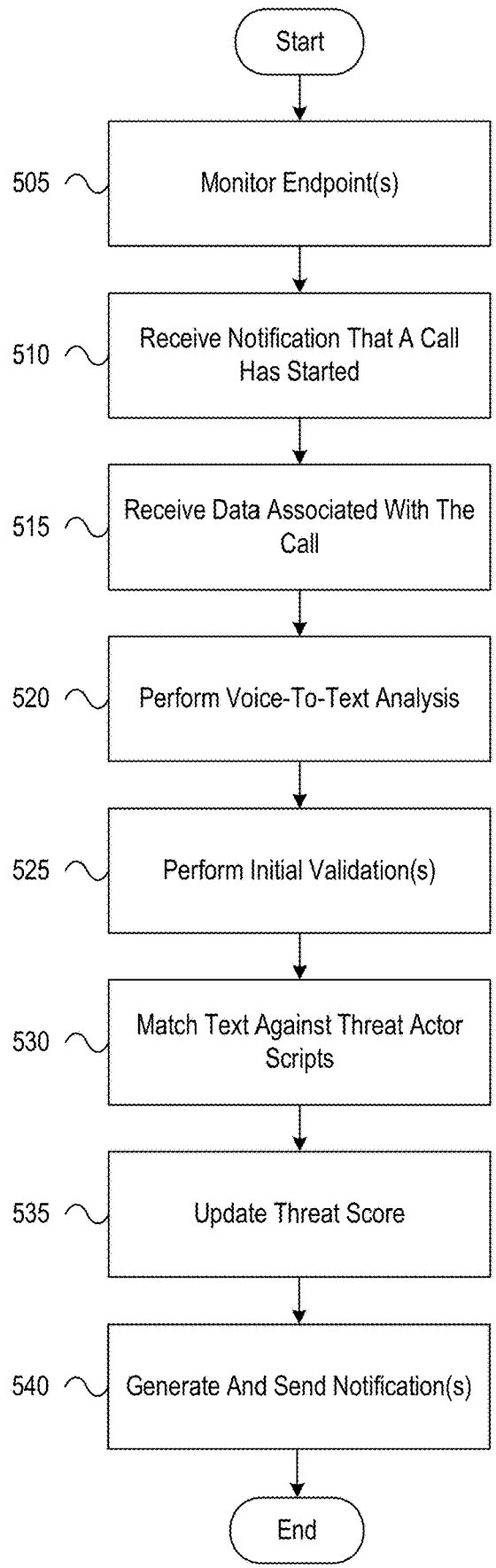
FIG. 5 depicts an illustrative method for detecting and protecting against employee targeted phishing attacks in accordance with one or more example embodiments.

FIG. 5 depicts an illustrative method for detecting and protecting against employee targeted phishing attacks in accordance with one or more example embodiments. Referring to FIG. 5, at step 505, a computing platform having at least one processor, a communication interface, and memory may monitor an endpoint device. At step 510, the computing platform may receive a notification that a call has started on the endpoint device. At step 515, the computing platform may receive data associated with the call. At step 520, the computing platform may apply voice-to-text analysis of the received data. At step 525, the computing platform may perform initial validations of the received data converted to text. At step 530, the computing platform may match the text against threat actor scripts. At step 535, the computing platform may update an information security threat score. At step 540, the computing platform may send a message to the endpoint device indicating that a potential information security threat has been detected.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
      monitor an endpoint device for a call, wherein the endpoint device is a mobile device of a user;
      receive, via the communication interface, a notification that a call has started on the endpoint device;
      receive, via the communication interface, data associated with the call;
      apply voice-to-text analysis of the received data, wherein applying voice-to-text analysis includes detecting whether a modulated voice pitch is present in the received data;
      perform initial validations of the received data converted to text, wherein performing initial validations includes validating a name of a caller and comparing the name against a corporate directory to determine whether the caller is legitimate;
      match the text against threat actor scripts;
      update an information security threat score; and send, via the communication interface, to the endpoint device, a message indicating that a potential information security threat has been detected.

2. The computing platform of claim 1, wherein performing the initial validations further comprises validating a phone number associated with the call.

3. The computing platform of claim 1, wherein the memory stores additional computer-readable instructions that, when executed by the at least one processor, cause the computing platform to:
record the data associated with the call.

4. The computing platform of claim 1, wherein the memory stores additional computer-readable instructions that, when executed by the at least one processor, cause the computing platform to:
detect an information security policy break; and
cause the call on the endpoint device to be terminated in response to detecting the policy break.

5. The computing platform of claim 1, wherein the memory stores additional computer-readable instructions that, when executed by the at least one processor, cause the computing platform to:
send, via the communication interface, to the endpoint device, a message indicating that the call has been terminated.

6. The computing platform of claim 1, wherein monitoring the endpoint device comprises monitoring activity associated with a call on athe mobile phone.

7. The computing platform of claim 1, wherein detecting an information security policy break comprises detecting that a receiver of the call has supplied sensitive information.

8. The computing platform of claim 1, wherein a receiver of the call is an employee operating the endpoint device.

9. The computing platform of claim 1, wherein the memory stores additional computer-readable instructions that, when executed by the at least one processor, cause the computing platform to:
based on the received data associated with the call, update a machine learning model used to identify the potential information security threat.

10. A method, comprising:
at a computing platform comprising at least one processor, a communication interface, and memory:
monitoring, by the at least one processor, an endpoint device for a call, wherein the endpoint device is a mobile device of a user;
receiving, by the at least one processor, via the communication interface, a notification that a call has started on the endpoint device;
receiving, by the at least one processor, via the communication interface, data associated with the call;
applying, by the at least one processor, voice-to-text analysis of the received data, wherein applying voice-to-text analysis includes detecting whether a modulated voice pitch is present in the received data;
performing, by the at least one processor, initial validations of the received data converted to text, wherein performing initial validations includes validating a name of a caller and comparing the name against a corporate directory to determine whether the caller is legitimate;
matching, by the at least one processor, the text against threat actor scripts;
updating, by the at least one processor, an information security threat score; and
sending, by the at least one processor, via the communication interface, to the endpoint device, a message indicating that a potential information security threat has been detected.

11. The method of claim 10, wherein performing the initial validations further comprises validating a phone number associated with the call.

12. The method of claim 10, further comprising:
recording, by the at least one processor, the data associated with the call.

13. The method of claim 10, further comprising:
detecting, by the at least one processor, an information security policy break; and
causing, by the at least one processor, the call on the endpoint device to be terminated in response to detecting the policy break.

14. The method of claim 10, further comprising:
sending, by the at least one processor, via the communication interface, a message to the endpoint device indicating that the call has been terminated.

15. The method of claim 10, wherein monitoring the endpoint device comprises monitoring activity associated with a call on the mobile phone.

16. The method of claim 10, wherein detecting an information security policy break comprises detecting that a receiver of the call has supplied sensitive information.

17. The method of claim 10, wherein a receiver of the call is an employee operating the endpoint device.

18. The method of claim 10, further comprising:
based on the received data associated with the call, updating, by the at least one processor, a machine learning model used to identify the potential information security threat.

19. One or more non-transitory computer-readable media storing instructions that, when executed by a computing platform comprising at least one processor, a communication interface, and memory, cause the computing platform to:
monitor an endpoint device for a call, wherein the endpoint device is a mobile device of a user;
receive, via the communication interface, a notification that a call has started on the endpoint device;
receive, via the communication interface, data associated with the call;
apply voice-to-text analysis of the received data, wherein applying voice-to-text analysis includes detecting whether a modulated voice pitch is present in the received data;
perform initial validations of the received data converted to text, wherein performing initial validations includes validating a name of a caller and comparing the name against a corporate directory to determine whether the caller is legitimate;
match the text against threat actor scripts;
update an information security threat score; and
send, via the communication interface, to the endpoint device, a message indicating that a potential information security threat has been detected.

* * * * *